April 7, 1964   W. R. R. PARK ETAL   3,128,200
COATED ALKENYL AROMATIC ARTICLE AND METHOD OF COATING
Filed Nov. 24, 1961
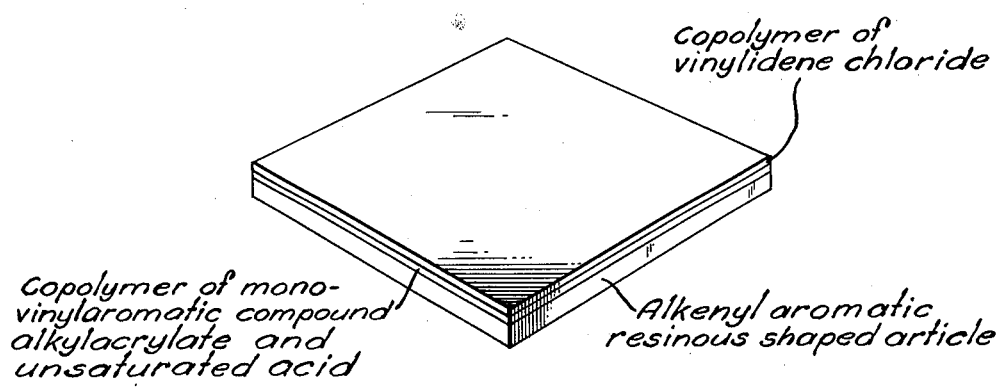
INVENTORS.
William R. R. Park
Jerome H. Stickelmeyer
BY
AGENT

United States Patent Office 3,128,200
Patented Apr. 7, 1964

3,128,200
COATED ALKENYL AROMATIC ARTICLE AND
METHOD OF COATING
William R. R. Park and Jerome H. Stickelmeyer, both of
Midland, Mich., assignors to The Dow Chemical Company, Midland, Mich., a corporation of Delaware
Filed Nov. 24, 1961, Ser. No. 154,490
19 Claims. (Cl. 117—72)

This invention relates to a barrier and/or heat sealable, coated oriented alkenyl aromatic resinous shaped article and method for the preparation thereof. It more particularly relates to an alkenyl aromatic resinous shaped article such as a film or sheet having a coating of a copolymer of a vinyl aromatic compound and an acrylate as a base coat for a heat sealable coating comprising a vinylidene chloride resin.

The invention is particularly adapted to be practiced with integral solid styrene polymer film or sheets. Such a polymer, which may have an essentially linear molecular configuration or be in a cross-linked form is employed herein as being generally representative of alkenyl aromatic compounds of the type that contain at least about 50 weight percent of at least one polymerized alkenyl aromatic compound or monomer having the general formula: Ar—CR=CH$_2$, wherein R is hydrogen or methyl and Ar is an aromatic radical, advantageously of the benzene series, of from 6 to 10 carbon atoms (including the carbon atoms in any ring substituents on the aromatic nucleus). Thermoplastic polymers and copolymers of styrene and polymers and copolymers of α-methyl styrene, ar-methyl styrene (or vinyl toluene), the several mono- and di-chlorostyrenes and ar-dimethyl styrenes, including copolymers thereof with such materials as vinylidene chloride and acrylonitrile; and graft copolymers with other polymeric substances (such as other elastomeric polymers) may frequently be utilized with benefits commensurate with or in excess of those which are derivable from employment of polystyrene alone.

Flexible films may be prepared from the above-described thermoplastic materials by thermal fabrication, specifically extrusion. Processes, techniques, and apparatus for such fabrication are known. Other techniques include solvent casting the compositions from a volatile solvent followed by evaporation of the solvent. Flexible films of these alkenyl aromatic resins may be prepared in a variety of gauges, colors, and widths. As commercially available, such films are sold in a thickness of from about 0.0003 to about 0.015 inch. Since the modifications contemplated by this invention involve primarily surface phenomena, they are adaptable to any size, shape or thickness where uniform coatings may be applied. The modifications are also useful with other moldings, extrusions, or any other thick section of a rigid or semi-rigid nature. However, with such articles of thick section the need for heat sealability is rather remote. Consequently, the attainment of that property alone may not be justification for the treatment. However, the process results in other advantages, as will be described. Thus, it is not intended to limit the process or the resulting articles to any particular shape, although heat sealable, coated flexible films and sheets are the more frequently desired end products.

Oriented alkenyl aromatic resinous film and similar shaped articles present great difficulty in the heat sealing thereof. As the temperature of the film or shaped article is raised to a point where heat sealing will occur, shrinkage and distortion of the body to be sealed will take place prior to joining the opposed surfaces. This situation leads to unsightly and undesirable seals which lack strength and are, in general, unacceptable. In United States Letters Patent 2,979,419, a method is disclosed for rendering alkenyl aromatic resins heat sealable by employing a dual coating system. The disclosed process renders alkenyl aromatic resinous shaped articles heat sealable below the temperature at which they shrink and yet renders them substantially block free up to temperatures of 50° to 60° centigrade. A styrene-butadiene type latex composition is employed to adhere the sealable barrier coat to the alkenyl aromatic resinous substrate. In commercial practice this is a sticky adherent material which renders production of coated articles difficult, as the coating should not contact a roll or similar supporting means prior to the application of the sealable and generally block free top coat in order to minimize any mechanical defects in the final surface. The nature of this adhesive coat precludes the possibility of rolling a single coated sheet into a mill or supply roll. Elastomeric styrene-butadiene latex compositions are relatively unstable unless a relatively high proportion of one or more surface-active agents are incorporated therein. In high speed coating there is a marked tendency for foam or froth to appear at the coating head which often gives rise to non-uniformity in the thickness of the coating. Antifoam agents may be employed, but tend to detract from the physical properties of the finished product.

It is an object of this invention to provide an improved barrier and/or heat sealable coating for alkenyl aromatic resins.

It is a further object of this invention to provide a barrier and/or sealable coating adhered to non-blocking base coated alkenyl aromatic resin.

It is another object of this invention to provide a barrier and/or a heat seal coating method for alkenyl aromatic resin articles which permits a base coated article to come in contact with a like or different surface and be separated therefrom without damage to either surface.

It is a further object of this invention to provide an easily applied nonblocking adhesive base coat which may be applied from an aqueous dispersion for a subsequently applied barrier and/or heat seal coating for alkenyl aromatic resinous shaped articles.

These benefits and other advantages are readily achieved in accordance with the invention by applying to a hydrophilic surface of an alkenyl aromatic resinous article a continuous coating comprised of an aqueous dispersion of a copolymer consisting essentially of (a) from 40 to 60 percent by weight of a monovinyl aromatic compound of 8 to 10 carbon atoms wherein the vinyl group is attached directly to the benzene ring; (b) from 35 to 50 percent by weight of an alkyl acrylate; and (c) from about 0.25 to about 10 percent by weight of a copolymerizable unsaturated acid selected from the group consisting of acrylic acid, methacrylic acid, and itaconic acid, subsequently drying from said aqueous dispersion to deposit a continuous adherent coating on said shaped article, applying over the first coating a second coating of an aqueous dispersion of a copolymer comprising at least 70 percent by weight of vinylidene chloride and at least one other monomer copolymerizable therewith, and drying said second coating to a clear coherent coating. An article in accordance with the invention is depicted in the drawing.

Surfaces of alkenyl aromatic resinous shaped articles are rendered hydrophilic by several treatments well known to the art. In general, any treatment which renders polyethylene more printable causes an alkenyl aromatic resinous surface to become more hydrophilic. Typical treatments are surface sulfonation, surface chlorination, corona discharge techniques and similar electronic treatments, as well as flame treating. Some of the processes which are adaptable to the purpose of the present invention are described in United States Letters Patent 2,632,921; 2,648,097; 2,704,382; 2,910,723; 2,939,956; 2,876,185; 2,876,186; and 2,876,187. The degree of surface treatment necessary is only sufficient to cause the aqueous polymeric dispersion to wet the surface of the film evenly.

The first or base coating composition utilized in the practice of the invention is an aqueous dispersion or latex of a copolymer having three essential components. One is a monovinyl aromatic monomer such as styrene or vinyl toluene, vinyl xylene, and vinyl ethyl benzene. The second component of the copolymer system is an acrylic acid ester or mixture thereof containing up to about 14 carbon atoms in the alkyl group. The third component is acrylic acid, itaconic acid, or methacrylic acid or mixtures thereof and is incorporated in the monomer mixture in proportions from about 0.25 to about 12 percent.

A typical polymerization recipe comprises 55.2 parts of styrene, 35.2 parts ethyl acrylate, 5.8 parts normal butyl acrylate, 3.8 parts methacrylic acid, .75 part 2-sulfoethyl acrylate. The monomeric ingredients are mixed together and added over a period of about one hour to 150 parts of water, held at a temperature of 70° centigrade and containing one percent potassium persulfate based on the weight of the monomer charge. The reaction mixture is gently agitated for the duration of the reaction, which is approximately 9 hours.

The second coating to be deposited is a latex of a polymer of vinylidene chloride. Although any of the film-forming polymers of vinylidene chloride may be employed, it is preferred to employ those containing at least about 70 percent by weight of vinylidene chloride with the remainder made up predominantly of acrylonitrile, vinyl chloride and alkyl acrylate. Copolymers of the preferred composition exhibit properties, such as low moisture vapor transmission, toughness, clarity, elongation, and the like, that make them peculiarly well adapted for use in flexible film manufacture for packaging purposes. Although less than 70 percent by weight vinylidene chloride may be used, it is done at a sacrifice of some of the above-named properties, and especially of the water and gas transmission properties. The acrylate is used to internally plasticize or to soften the polymeric material to enhance the latex film-forming ability and to improve heat sealibility of the coating.

An example of a useful latex is one prepared by the emulsion polymerization of 85 percent vinylidene chloride, 13 percent VCN and 2 percent 2-ethylhexyl acrylate.

Although the above polymeric compositions are most easily obtained through copolymerization methods, it has been found that available latexes may be blended to arrive at a final composition having desired properties. An example of such a blend is one composed of 90 parts of the prior described latex of the ternary polymer and 10 parts of solids of a latex prepared by the emulsion polymerization of 20 percent vinyl chloride and 80 percent vinylidene chloride. Other useful blends will be apparent to those skilled in the art.

Each of the coatings of this process may be applied by known coating techniques, including brushing, spraying, roller coating, dipping, or other means. To maintain uniform, reproducible properties and characteristics it is essential that each coating be of substantially uniform thickness. Thus, after application or simultaneously therewith, but before drying, of the latex in each instance there may be used known doctoring means, such as a doctor blade, squeeze rolls, or a planiform stream of air commonly referred to as an air knife or air doctor, to remove excess latex.

Subsequent to the application thereof, the first or base coating is dried by exposure to a current of warm humid air, infrared lamps, or similar conventional means. The coating compositions utilized in the practice of the present invention must be dried to yield substantially continuous coating. Usually, the wet coat should be raised to a temperature of about 50° centigrade before the water is permitted to escape, otherwise a dusty and discontinuous coating may result. The drying temperature should not be sufficiently high to cause deorientation of the alkenyl aromatic resin substrates. Once the film is coated, cooled and wound into a stock roll, no difficulty is encountered with blocking of the coated product when stored at temperatures up to about 50° centigrade.

To achieve desirable properties, it is necessary that each of the coatings completely cover the surface to be coated. As a practical matter, such coatings will, if conventional coating techniques are followed, be of a thickness of combined coating of at least 0.0001 inch. Additionally, coatings which are greater than about 0.05 inch are difficult to dry without special apparatus and methods. Accordingly, it is preferred to have the combined coatings of a thickness of from about 0.0001 to 0.05 inch.

The articles may be treated in accordance with this invention on either one or both surfaces, depending upon the end use for which the article is to be employed. The articles, after treatment, may have impressions printed or stamped thereon usually without affecting the barrier, heat sealability, or other properties. Also, the coated films may be used with conventional wrapping and packaging machinery without serious effect on the coating.

Advantageously, other components may be added to either coating systems prior to its application onto the alkenyl aromatic resinous shaped article. Typical additives are dyes, pigments, wax fillers, and the like. Generally, such additaments should not exceed about 10 percent by weight of the polymeric substituents of the dispersion.

By way of further illustration, a number of different latexes were prepared in the manner as previously outlined. The compositions of these latexes are set forth in Table I. The latexes were deposited from 35–50 percent solids dispersions in water on the surface of one mil thick oriented polystyrene film which was rendered hydrophilic by a corona discharge treatment to give a coating of about 0.0001 inch in thickness and subsequently dried between a temperature of about 50° centigrade and about 90° centigrade. The coated film was then subjected to a test for blocking. The blocking test comprised placing the coated film in face-to-face contact under a pressure of about 1 pound per square inch for a period of about 16 hours. Various samples of the film undergoing block tests were maintained as specified temperatures, and after a 16 hour period had elapsed, pressure was removed from the film samples and they were gently peeled apart by hand. If the samples freely separated, no blocking occurred, this is designated in Table I in the column "Blocking at 35° centigrade" by the word "none." After drying, a second coating was applied over the first coating in an identical manner. The second latex was prepared by the emulsion polymerization of 85 percent vinylidene chloride, 10 percent acrylonitrile and 5 percent butyl acrylate. The latex contained 35 percent polymeric solids. The second coating was dried to a clear coherent coating. The combined coating thickness was 0.0001 inch. The result was a clear, glossy, flexible film. Heat sealing was accomplished in a conventional manner in a jaw sealer whose jaws were heated to a temperature of about 185° Fahrenheit, under a pressure of about 5 pounds per square inch and having a dwell time of about 1 second. The heat seals were then tested by pulling the seals apart, that is, by applying tension at 90° to the surface of the seal. In Table I the numbers in the columns under the monomer names signify parts utilized through the monomer mixture. Also set forth is a heat seal strength which was determined on seals made on a commercial heat sealing machine which was not modified for precision sealing.

Table I

| Example | Styrene | Vinyl Toluene | Methyl Acrylate | Ethyl Acrylate | n-Butyl Acrylate | Isobutyl Acrylate | 2-Ethylhexyl Acrylate | Acrylic Acid | Methacrylic Acid | Itaconic Acid | Blocking at 35° C. | Heat Seal grams/inch |
|---|---|---|---|---|---|---|---|---|---|---|---|---|
| 1 | 55.2 | | | 35.2 | 5.8 | | | 3.8 | | | None | 370 |
| 2 | 45.2 | | | 45.2 | 5.8 | | | 3.8 | | | None | 294 |
| 3 | 40.2 | | | 50.2 | 5.8 | | | 3.8 | | | None | 238 |
| 4 | 53.0 | | | 37.4 | 5.8 | | | | 3.8 | | None | 165 |
| 5 | 54.8 | | | 38.7 | 6.0 | | | 0.5 | | | None | 212 |
| 6 | 54.0 | | | 38.1 | 5.9 | | | 2.0 | | | None | 214 |
| 7 | 51.8 | | | 36.6 | 5.7 | | | 5.9 | | | None | 286 |
| 8 | 50.8 | | | 35.9 | 5.6 | | | 7.7 | | | None | 157 |
| 9 | 49.9 | | | 35.2 | 5.5 | | | 9.4 | | | None | 197 |
| 10 | 53.0 | | 37.4 | | 5.8 | | | 3.8 | | | None | 266 |
| 11 | 53.0 | | | | 5.8 | | 37.4 | 3.8 | | | None | 139 |
| 12 | 53.0 | | | | 43.2 | | | 3.8 | | | None | 149 |
| 13 | 53.0 | | | | 5.8 | 37.4 | | 3.8 | | | None | 130 |
| 14 | 53.0 | | | 37.4 | 5.8 | | | | | 3.8 | None | 276 |
| 15 | 55.2 | | | 38.9 | 2.0 | | | 3.9 | | | None | 201 |
| 16 | 54.0 | | | 38.0 | 4.1 | | | 3.9 | | | None | 198 |
| 17 | 51.8 | | | 36.6 | 7.9 | | | 3.7 | | | None | 260 |
| 18 | 50.8 | | | 35.9 | 9.7 | | | 3.6 | | | None | 269 |
| 19 | | O 53 | | 37.4 | 5.8 | | | 3.8 | | | None | 244 |
| 20 | | m/p 53 | | 37.4 | 5.8 | | | 3.8 | | | None | 152 |

O = ortho vinyl toluene.
m/p = mixture of meta and para vinyl toluene.

Table II

| Vinylidene Chloride | Acrylonitrile | Vinyl Chloride | Methyl Acrylate | Methyl Methacrylate | Ethyl Acrylate | n-Butyl Acrylate | 2-Ethylhexyl Acrylate |
|---|---|---|---|---|---|---|---|
| 97 | 3 | | | | | | |
| 90 | 10 | | | | | | |
| 89 | 11 | | | | | | |
| 85 | 15 | | | | | | |
| 80 | 20 | | | | | | |
| 86 | 6 | 8 | | | | | |
| 85 | | 8 | | | 7 | | |
| 85 | | 10 | | | | | 5 |
| 75 | | 20 | | | 5 | | |
| 88 | 10 | | | | 2 | | |
| 85 | 10 | | | | 5 | | |
| 88 | | | 10 | | | 2 | |
| 85 | | | 10 | | | 5 | |
| 88 | | | | 10 | | 2 | |
| 88 | 10 | | | | | 2 | |
| 85 | 13 | | | | | 2 | |
| 85 | 12 | | | | | 3 | |
| 85 | 11 | | | | | 4 | |
| 85 | 10 | | | | | 5 | |
| 80 | 10 | | | | | 10 | |
| 88 | 10 | | | | | | 2 |
| 87 | 11 | | | | | | 2 |
| 86 | 12 | | | | | | 2 |
| 86 | 11 | | | | | | 3 |
| 85 | 13 | | | | | | 2 |

Objectionable foaming was substantially absent during the application of the first latex coat. After drying of the first coat there was no tendency observed for the dry vinyl aromatic-acrylate coated sheet to adhere to operating surfaces such as rolls and the like with which it came into contact.

Similar results including a high degree of adhesion of the top coat to the base coat are obtained when latexes having the compositions indicated in Table II are employed as the vinylidene chloride containing copolymer latex in combination with the base coat latex compositions set forth in Table I. In Table II the numbers report parts by weight of the polymerized monomeric constituent in the polymer composition.

In a similar manner, other alkenyl aromatic resinous films and shaped articles are readily processed to heat sealable coated articles by the application of latex compositions in accordance with the invention.

As is apparent from the foregoing specification, the method and manufacture of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:
1. A method of providing an alkenyl aromatic resinous shaped article with an adherable coating of a vinylidene chloride copolymer, said method comprising
   (1) applying to a hydrophilic surface of an alkenyl aromatic resinous article a continuous coating comprised of an aqueous dispersion of a copolymer consisting essentially of
      (a) from 40 to 60 percent by weight of a monovinyl aromatic compound of 8 to 10 carbon atoms wherein the vinyl group is attached directly to the benzene ring;
      (b) from 35 to 50 percent by weight of an alkyl acrylate,
      (c) from about 0.25 to about 10 percent by weight of a copolymerizable unsaturated acid selected from the group consisting of acrylic acid, methacrylic acid, and itaconic acid,
      and drying said aqueous dispersion to deposit a continuous adherent coating on said shaped article,
   (2) applying over the dried coating a second coating of an aqueous dispersion of a copolymer comprising at least 70 percent by weight of vinylidene chloride and at least one other monomer copolymerizable therewith, and
      drying said second coating.

2. The method of claim 1, wherein said shaped article comprises polystyrene.

3. The method of claim 1, wherein said first aqueous copolymer coating is dried at a temperature of from about 50° centigrade to below the deorientation temperature of the oriented alkenyl aromatic resinous shaped article.

4. The method of claim 1, wherein said alkenyl aromatic resinous shaped article is a film.

5. The method of claim 4, wherein said monovinyl aromatic compound of the coating copolymer is styrene.

6. The method of claim 4, wherein said unsaturated acid of the coating copolymer is methacrylic acid.

7. The method of claim 4, wherein said film has been subjected to a corona discharge to render its surface hydrophilic.

8. The article of claim 12, wherein said article is a film.

9. The article of claim 12, wherein said alkenyl aromatic resin is polystyrene.

10. The article of claim 12, wherein said coating is a copolymer of styrene, butyl acrylate, ethyl acrylate and methacrylic acid.

11. The article of claim 12, wherein it has a heat sealable second coating.

12. A coated, nonblocking shaped article comprising an alkenyl aromatic resinous shaped article having on at least a portion of one surface thereof a continuous coating of a copolymer consisting essentially of
   (a) from 40 to 60 percent by weight of a monovinyl aromatic compound of 8 to 10 carbon atoms wherein the vinyl group is attached directly to the benzene ring;
   (b) from 35 to 50 percent by weight of an alkyl acrylate,
   (c) from about 0.25 to about 10 percent by weight of a copolymerizable unsaturated acid selected from the group consisting of acrylic acid, methacrylic acid, and itaconic acid,
        a second coating adhering to said copolymer coating comprising a copolymer, said copolymer comprising at least 70 percent by weight of vinylidene chloride and one other monomer copolymerizable therewith.

13. A method of providing an alkenyl aromatic resinous shaped article with an adherable coating of a vinylidene chloride copolymer, said method consisting essentially of (1) applying to a hydrophilic surface of an alkenyl aromatic resinous article a continuous coating
   comprised of an aqueous dispersion of a copolymer consisting essentially of
      (a) from 40 to 60 percent by weight of a monovinyl aromatic compound of 8 to 10 carbon atoms wherein the vinyl group is attached directly to the benzene ring;
      (b) from 35 to 50 percent by weight of an alkyl acrylate,
      (c) from about 0.25 to about 10 percent by weight of a copolymerizable unsaturated acid selected from the group consisting of acrylic acid, methacrylic acid, and itaconic acid,
      and drying said aqueous dispersion to deposit a continuous adherent coating on said shaped article,
(2) applying over the dried coating a second coating of an aqueous dispersion of a copolymer comprising at least 70 percent by weight of vinylidene chloride and at least one other monomer copolymerizable therewith, and
   drying said second coating.

14. The method of claim 13, wherein said shaped article comprises polystyrene.

15. The method of claim 13, wherein said first aqueous copolymer coating is dried at a temperature of from about 50° centigrade to below the deorientation temperature of the oriented alkenyl aromatic resinous shaped article.

16. The method of claim 13, wherein said alkenyl aromatic resinous shaped article is a film.

17. The method of claim 13, wherein said monovinyl aromatic compound of the coating copolymer is styrene.

18. The method of claim 13, wherein said unsaturated acid of the coating copolymer is methacrylic acid.

19. The method of claim 13, wherein said film has been subjected to a corona discharge to render its surface hydrophilic.

References Cited in the file of this patent
UNITED STATES PATENTS

| | | |
|---|---|---|
| 2,129,722 | Woodhouse | Sept. 22, 1938 |
| 2,876,187 | Polinski | Mar. 3, 1959 |
| 2,948,696 | Park | Aug. 9, 1960 |
| 2,979,419 | Hill et al. | Apr. 11, 1961 |